Aug. 30, 1960   W. R. POLANIN   2,950,782
CLASP BRAKE
Filed Dec. 20, 1956
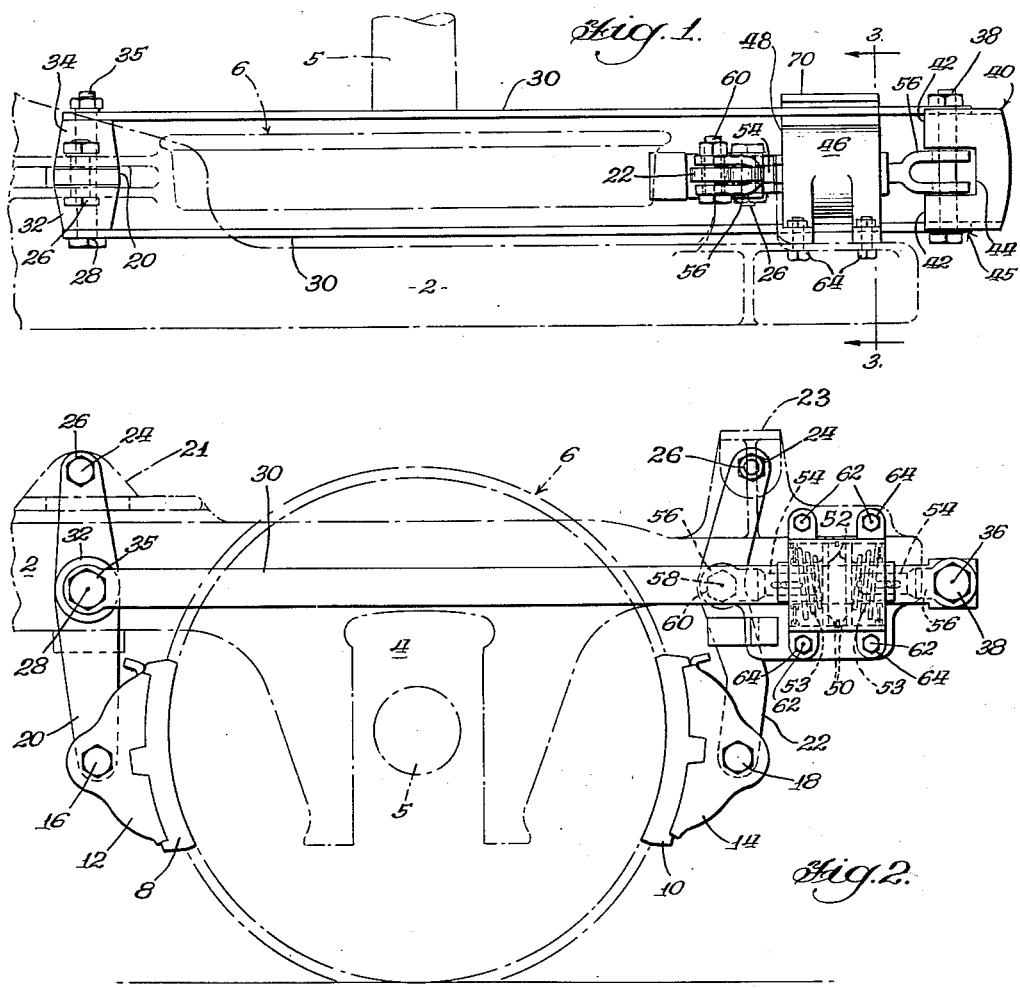
INVENTOR.
Walter R. Polanin
BY Walter L. Schlegel, Jr.
Atty.
Witness:
William N. Erxber

United States Patent Office 2,950,782
Patented Aug. 30, 1960

2,950,782
CLASP BRAKE

Walter R. Polanin, Chicago, Ill., assignor to American Steel Foundries, Chicago, Ill., a corporation of New Jersey Filed Dec. 20, 1956, Ser. No. 629,710

1 Claim. (Cl. 188—56)

My invention relates to brake mechanisms and more particularly to a simplified brake mechanism for a railway vehicle.

Increasing speed and weight of railway vehicles has created a greater need for brake mechanisms which have the necessary braking torque for stopping these vehicles. At the same time, these brake mechanisms must also be adapted to the limited amount of space allowed for their assembly to the vehicles.

An inadequate prior art solution to the problem of changing truck designs involving brake mechanisms is shown in a patent to McGowan, 2,543,326, which discloses a wheel and axle assembly and a brake system comprising a pair of brake levers located on opposite sides of the periphery of a wheel. The brake levers are supported at their upper ends by the frame and carry at their lower ends brake shoe assemblies. A pair of tie bars are disposed on both sides of the wheel, extend parallel to the wheel, and are located below the level of the axle associated with the wheel. One end of each bar is adjacent one brake lever. One end of each of the pair of bars connects to a floating power cylinder which in turn connects to an adjacent brake lever. The other end of each of the pair of bars is connected to a slack adjuster which connects to a brake lever on the opposite side of the wheel. A flexible and nonflexible tubing system connects the floating cylinder and slack adjuster. A stationary power cylinder is connected to the frame and is located above the brake system. A flexible and nonflexible tubing system connects the floating and stationary power cylinders.

When it is desired to apply the brakes the stationary power cylinder supplies fluid under pressure to the floating power cylinder. The floating power cylinder applies force towards the wheel and to its adjacent brake lever, and the brake lever engages the brake shoe assembly with the wheel. At the same time the reactive force of the floating power cylinder forces the ends of the connecting tie bars in a direction opposite that of the brake lever. The tie bars pull the slack adjusting mcehanism in a direction towards the wheel. The slack adjusting mechanism, in turn, moves its adjacent brake lever and shoe assembly towards the wheel. The shoe assembly, consequently, engages the wheel to frictionally retard the motion of the wheel.

The disadvantages of this type of brake system are many. The brake system contains many costly parts. Any replacement of parts in the McGowan design would require considerable time. Any damage to the tubing connecting the stationary power cylinder to the floating power cylinder or any damage to the tubing connecting the floating power cylinder to the slack adjusting mechanism would render the brake system inoperative. The entire brake system is below the level of the axle. Therefore any wheel and axle changes would require disassembly of the brake system. There is considerable lost motion in the pin and slot connections interconnecting the tie rods with the power cylinder and the slack adjusting equipment. Because of the lost motion of the brake system, the efficiency of the brake system is considerably decreased. Due to the frame supporting the brake system, power cylinder reaction is transferred to the frame. This transferred reaction results in a lower operating efficiency of the brake system. Also, as shown by the McGowan design, no appreciable force can be exerted by either brake shoe on the wheel until the opposite brake shoe engages the wheel, because the application of braking force by either shoe depends upon an opposite reactive force obtained from the other shoe which must be transmitted through the motor.

A primary object of the present invention discloses a brake arrangement having several novel features and advantages over prior art arrangements. One of the features of the invention is the disposition of all operating parts in a single plane thereby maintaining a high level of efficiency of operation.

Another important feature of the invention is that the operating parts for the brake heads are disposed at a level above the axle. This arrangement provides easy access to the wheels where they may be removed for repair or replacement without the necessity of disassembling or otherwise disturbing the brake mechanism. The power cylinder of the invention is secured to the frame and is of the duplex type having opposed pistons, one of which is connected to one of the brake levers and the other of which is connected to a strap which in turn is connected to a second brake lever. In this design, the only direct force from the power cylinder which is exerted on the frame is the weight of the power cylinder. Braking forces and reactions into the frame are greatly reduced with the brake mechanism illustrated, because portions of the reactions are contained in the brake mechanism itself. Also, due to the fact that the power cylinder is a stationary power cylinder, one brake shoe assembly can operate independently of the other without requiring reactive force from the other brake shoe assembly.

Therefore, it is an object of my invention to provide a brake mechanism simple in design in regards to both arrangement and parts of the mechanism.

Another object is to provide a mechanism which adapts itself to any wheel and axle assembly and will still be able to facilitate any wheel and axle changes.

A still further object is to eliminate brake cylinder reaction to the frame.

A more specific object is to place the entire brake mechanism in a single vertical plane and place all parts except the brake head assembly above the level of the center line of the axle, thus maintaining a high level of efficiency of the brake mechanism.

My invention is illustrated herein as applied to a four wheel truck having clasp brakes. The brakes have conventional brake shoes, brake heads and brake levers.

In the drawings:

Figure 1 is a top plan view of a railway car wheel embodying my invention;

Figure 2 is a side elevational view of the embodiment of Figure 1, and

Figure 3 is a sectional view taken substantially on line 3—3 of Figure 1.

Portions of the figures have been omitted in certain views and have been drawn in phantom in other views as these portions are conventional.

Describing the structure in detail, the truck may comprise a frame 2, which has a conventional bolster (not shown) resiliently supported by springs. The side frame has a journal box opening 4 for receiving a journal box (not shown). The journal box contains an axle 5 of a wheel and axle assembly 6.

The brake system comprises brake shoes 8 and 10 carried in a conventional manner by brake heads 12 and 14, respectively. Brake heads 12 and 14 are pivotally supported at 16 and 18, respectively, as by pins, at the lower ends of brake hanger levers 20 and 22, respectively. The upper ends of brake hanger levers 20 and 22 are pivotally connected at 24 to the frame 2 at brackets 21 and 23, respectively, by pin assemblies 26.

The brake lever 20 is located inwardly of wheel and axle assembly 6, and is pivotally connected at an intermediate point 28 to a pair of pull or tie bars 30. The pull bars 30 are disposed on the inboard and outboard sides of the wheel, extend parallel to the wheel, and are located above the center line of the axle associated with the wheel. Corresponding ends of the pull bars 30 are aligned by a pair of spacers 32 and 34 located at the intermediate point 28. The spacers 32 and 34 are disposed on both sides of brake lever 20. The spacers 32 and 34 maintain a constant linear displacement between the pair of corresponding pull bar ends adjacent brake lever 20 and these ends are pivotally connected by pin assembly 35. The other corresponding ends of pull bars 30 are pivotally connected as at 36, by pin assembly 38. Said other corresponding ends of pull bars 30 are separated from each other by a U-shaped bracket 40 comprising a pair of inwardly extending arms 42 which form a clevis opening 44. The U-shaped bracket 40 and the pair of pull bars form a U-shaped connecting member 45.

A power cylinder device 46 is located outwardly of the wheel and axle assembly 6 and inboardly of the frame 2. The power device 46 comprises a cylinder 48 having a pair of opposed pistons 50 (Figure 2) which have a pair of opposed piston faces 52. Piston springs 53 are disposed directly behind piston faces 52 and aid in returning the pistons to disengage the brakes from the wheels. Each piston 50 has a piston rod 54, and each rod 54 has a protruding end comprising a U-shaped clevis 56. The inwardly extending U-shaped clevis 56 is pivotally connected, as by pins 60, to an intermediate point 58 on the right brake hanger lever 22. The brake lever 22 is disposed outwardly of the wheel and axle assembly 6. The outwardly extending U-shaped clevis 56 is connected, as at 36, to the U-shaped bracket 40 in clevis opening 44 by the pin assembly 38. Power cylinder device 46 is secured to the frame at 62 by nut and bolt assemblies 64.

As best seen in Figure 3, a support bracket 66 is located on the inboard side of the power cylinder 48 for safety support of the inboard pull rod 30. The support bracket 66 is formed integral with the power cylinder or may be secured, as by welding, to the power cylinder, and it comprises a horizontal inboardly extending arm 68 and an upwardly extending arm 70 integral with the inboard end of arm 68. A support bracket 72 is located on the inboard side of frame 2 between the frame 2 and power cylinder device 46. The support bracket 72 may be secured, as by welding, to the frame 2, or may be integral with the power cylinder 48. The bracket 72 is a safety support for the outboardly disposed pull rod 30.

In operation, a source of hydraulic fluid (not shown) applies fluid pressure to the cylinder device 46 in the cylinder area located between the faces 52. The fluid pressure forces the pistons 50 and piston rods 54 away from the center of the cylinder. The rods, through their U-shaped clevis end connections 56, move pull bars 30 to the right and also move the right brake hanger lever 22 to the left. The right brake lever 22 engages the brake shoe 10, through brake head 14, with the wheel. As pull bars 30 move to the right, brake lever 20 moves to the right due to the fact that the lever 20 is connected to the pull bars at 28. Brake lever 20 consequently engages brake shoe 8, through brake head 12, with the wheel.

Upon release of the fluid pressure by the source of the hydraulic fluid (not shown) the springs behind the piston faces force the pistons and rods towards the cylinder center. The operation of disengaging the brakes is performed by moving the connecting parts of the brake system in the opposite direction as when applying the brakes.

Although a brake rigging for one wheel only is illustrated in Figures 1 and 2, it will be readily understood that in a truck having more than one axle, each wheel will be provided with a brake mechanism similar to that shown.

I claim:

In a clasp brake arrangement for a vehicle having a frame and a supporting wheel and axle assembly, the combination of: a pair of friction means disposed on opposite sides of a wheel of the assembly for engagement therewith; a pair of generally vertically extending dead brake levers disposed on opposite sides of the assembly, said levers being fulcrumed at their upper ends to the frame and being pivotally connected at their lower ends to respective friction means; a pair of generally horizontally extending pull bars disposed on opposite sides of said wheel, said bars having corresponding ends pivotally connected to one of said brake levers intermediate the ends of said lever and having their opposite corresponding ends extending beyond the other of said brake levers; a power cylinder device disposed between said pull bars at said opposite corresponding ends of said bars, said power cylinder device comprising a housing and a pair of axially aligned push rods movable in opposite directions relative to said housing, one of said rods being pivotally connected to the other of said brake levers, and the other of said push rods being pivotally connected to said opposite corresponding ends of the pull bars; and a support bracket secured to the frame on the side thereof adjacent said wheel, said bracket having a center portion disposed between said pull bars for supporting the power cylinder housing and having a pair of flanged shelf portions extending laterally outward from opposite sides of the center portion for guidably supporting the respective pull bars, said center portion of said bracket being disposed in the plane of said wheel.

References Cited in the file of this patent

UNITED STATES PATENTS

| | | |
|---|---|---|
| 418,574 | Lawrence | Dec. 31, 1889 |
| 531,287 | Allen | Dec. 18, 1894 |
| 2,273,634 | Frede | Feb. 17, 1942 |
| 2,273,635 | Frede | Feb. 17, 1942 |
| 2,543,326 | McGowan | Feb. 27, 1951 |

FOREIGN PATENTS

| | | |
|---|---|---|
| 4,088 | Great Britain | of 1905 |
| 5,333 | Great Britain | of 1906 |